United States Patent [19]

Lindgren

[11] 3,887,799

[45] June 3, 1975

[54] ASYNCHRONOUS N BIT POSITION DATA SHIFTER

[76] Inventor: Theodore P. Lindgren, 4653 Lisann, San Diego, Calif. 92117

[22] Filed: Dec. 3, 1973

[21] Appl. No.: 421,366

[52] U.S. Cl. .............................. 235/164; 340/172.5
[51] Int. Cl. .............................................. G06f 7/00
[58] Field of Search ......... 235/164, 156; 340/166 R, 340/172.5

[56] References Cited

UNITED STATES PATENTS

| | | | |
|---|---|---|---|
| 3,588,483 | 6/1971 | Lesniewski | 235/164 X |
| 3,691,359 | 9/1972 | Dell et al. | 235/164 |
| 3,818,203 | 6/1974 | Perlowski et al. | 235/164 |

*Primary Examiner*—David H. Malzahn
*Attorney, Agent, or Firm*—R. S. Sciascia; G. J. Rubens; T. M. Phillips

[57] ABSTRACT

An asynchronous data bit shifter for shifting a data word to the left or right depending on the value of the shift select word. A matrix of tri-state gates arranged in columns and rows and wired in a staggered combination performs the shifting. The matrix will shift an input data word directly to any output word position by addressing the appropriate shift select word.

4 Claims, 4 Drawing Figures

| SHIFT SELECT WORD | | | | ROW ENABLED | |
|---|---|---|---|---|---|
| $A_3$ | $A_2$ | $A_1$ | $A_0$ | SHIFT LEFT | SHIFT RIGHT |
| L | L | L | L | A | I |
| L | L | L | H | B | H |
| L | L | H | L | C | G |
| L | L | H | H | D | F |
| L | H | L | L | E | E |
| L | H | L | H | F | D |
| L | H | H | L | G | C |
| L | H | H | H | H | B |
| H | X | X | X | I | A |

ASYNCHRONOUS N BIT POSITION DATA SHIFTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In data shifting, for example, normalizing data, it is desirable to shift a word, n bits to the left or right. In the past this has been done by parallel-loading the data word into a shift register either by clocking and by careful asynchronous timing, then changing the control mode of the shift register from parallel load to a shift right or shift left load and then clocking the shift register, n, number of clock pulses and at the same time carefully keeping track of the number of clock pulses making sure not to cut off any of the pulses too soon or too late. This could introduce error in the number of positions the shift register was shifted. The major disadvantage of this type shift register, for example, the Texas Instrument Model No. SN74198 is that the timing and control required to make the shifter work properly requiring more equipment and requiring a relatively long time (at least eight clock pulses).

SUMMARY OF THE INVENTION

The present invention provides an asynchronous data shifter which will shift parallel input words left or right to any output position. The output position is determined by the value of the shift select word without requiring any clocking. A tri-state gate array performs the asynchronous shift and incorporates a novel interconnection scheme for the gate inputs. The array is made up of rows and columns of tri-state gates connected in a staggered manner. In the shift left mode the data, carry and control input are fed into the array in such a manner as to cause a data word to shift to the left a desired number of positions. In the shift right mode the data and carry inputs are interchanged, while the control enable inputs are reversed in order. The array is connected so that the outputs are bused in columns. Expansion of the data shifter can be expanded directly by adding more columns and rows to the array.

OBJECTS OF THE INVENTION

Accordingly, an object of the invention is the provision of an asynchronous data shifter which does not need any clocks or special timing circuits.

Another object of the invention is the provision of an asynchronous data shifter which can shift the input data word directly from any output position to any position left or right by addressing the appropriate shift select words.

A further object of the invention is the provision of a novel, tri-state gate array for use in an asynchronous data shifter which lends itself to expansion by means of adding additional rows and columns.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figures 1, 4:
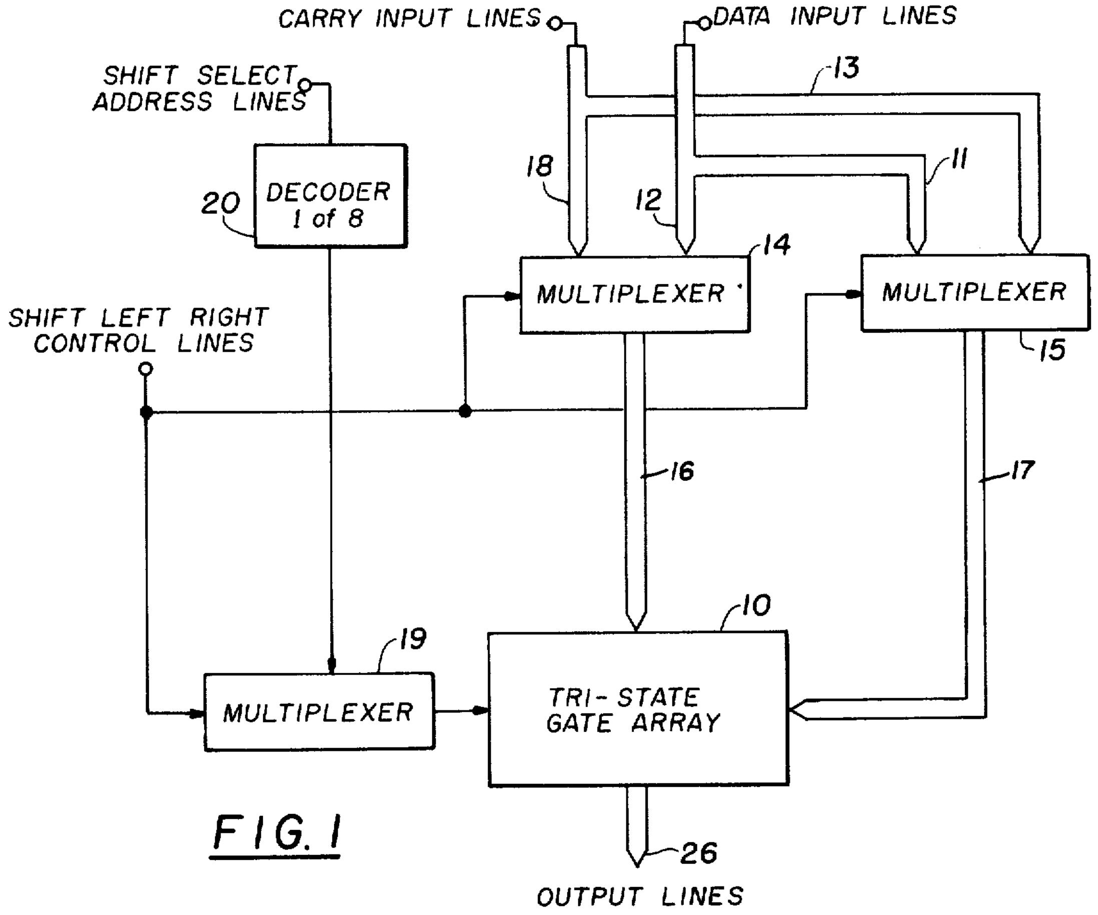
FIG. 1 is a functional block diagram of the preferred embodiment of the invention.
FIG. 4 is a table showing the correlation between the shift select words and the row enable lines.

Referring now to the drawings wherein there is shown in FIG. 1 a tri-state gate array 10 for performing the shift operation of input data fed into input line 12. In the shift left mode, the input data is fed through input line 12, multiplexer 14, and input line 16 while the carry input is fed through line 13 and multiplexer 15. In the shift right mode, the input data is fed through line 11, multiplexer 15 and input line 17 while the carry input is fed through line 18, multiplexer 14, and line 16. The control signal for shifting right or left is fed to multiplexers, 14, 15, and 19. The shift select word is fed through decoder 20 and multiplexer 19 to tri-state gate array 10. The shifted output word appears at output 26.

Figure 2:
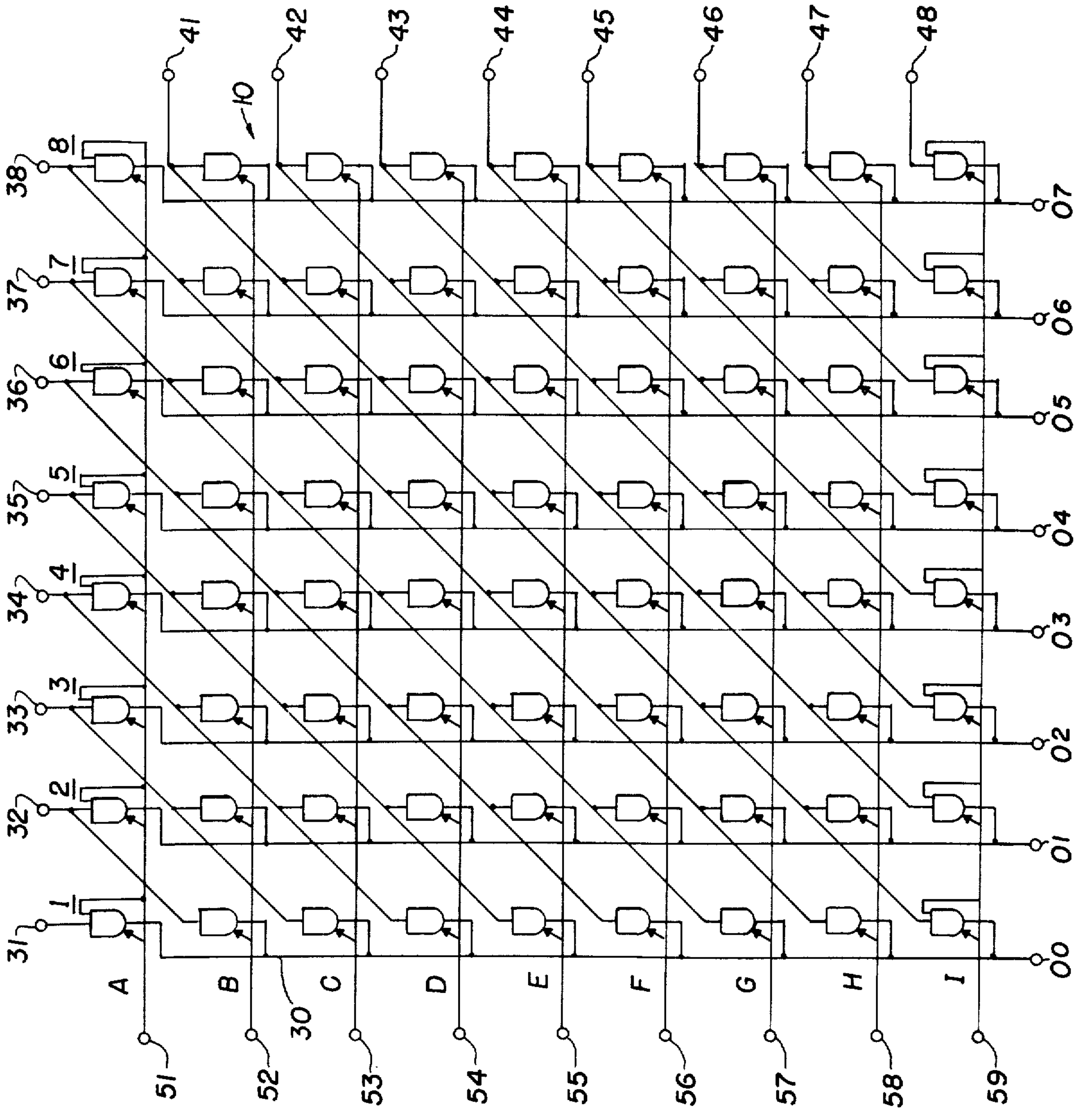
FIG. 2 is a diagram showing the wiring of the tri-state gate array of FIG. 1.

Referring now to FIG. 2 the tri-state gate array consists of columns 1 through 8 and nine enabling rows, A through I. All the gates in a column have their outputs coupled to a common bus. For example, all the gates in column 1 are connected to the common bus 30 to provide an output at $O_0$. For one-half of the matrix the input signals are fed to input terminals 31 through 38. For the other half of the matrix the input signals are fed through input terminals 41 through 48. The inputs are connected to the gates in a staggered fashion. For example, the input at terminal 35 is connected to the input of the gates in row A, column 5, row B, column 4, row C, column 3, row D, column 2, row E, column 1. In the other half of the matrix the inputs are connected in a similar manner, for example, the input to terminal 44 is connected to the inputs of the gates in row E, column 8, row F, column 7, row G, column 6, row H, column 5, and row I, column 4. Control signals are fed in through input terminals 51 through 58. The output from the matrix always appears at the output terminals $O_0$ through $O_7$.

Multiplexer 14 which may be two quad two to one SN 7157 multiplexers is connected to the column inputs 31 through 38 while multiplexer 15 which may be two quad two to one SN 7157 multiplexers is connected to inputs 41 through 48. Multiplexers 14 and 15 are interconnected to allow for interchanging the terminals to which data and carrier signals enter the tri-state gate array 10. The interchange is accomplished by means of a directional shift signal applied to terminal 60, 62 and 64. This interchange of inputs provides a means for full left or full right shift of data without any change in wiring.

Figure 3:
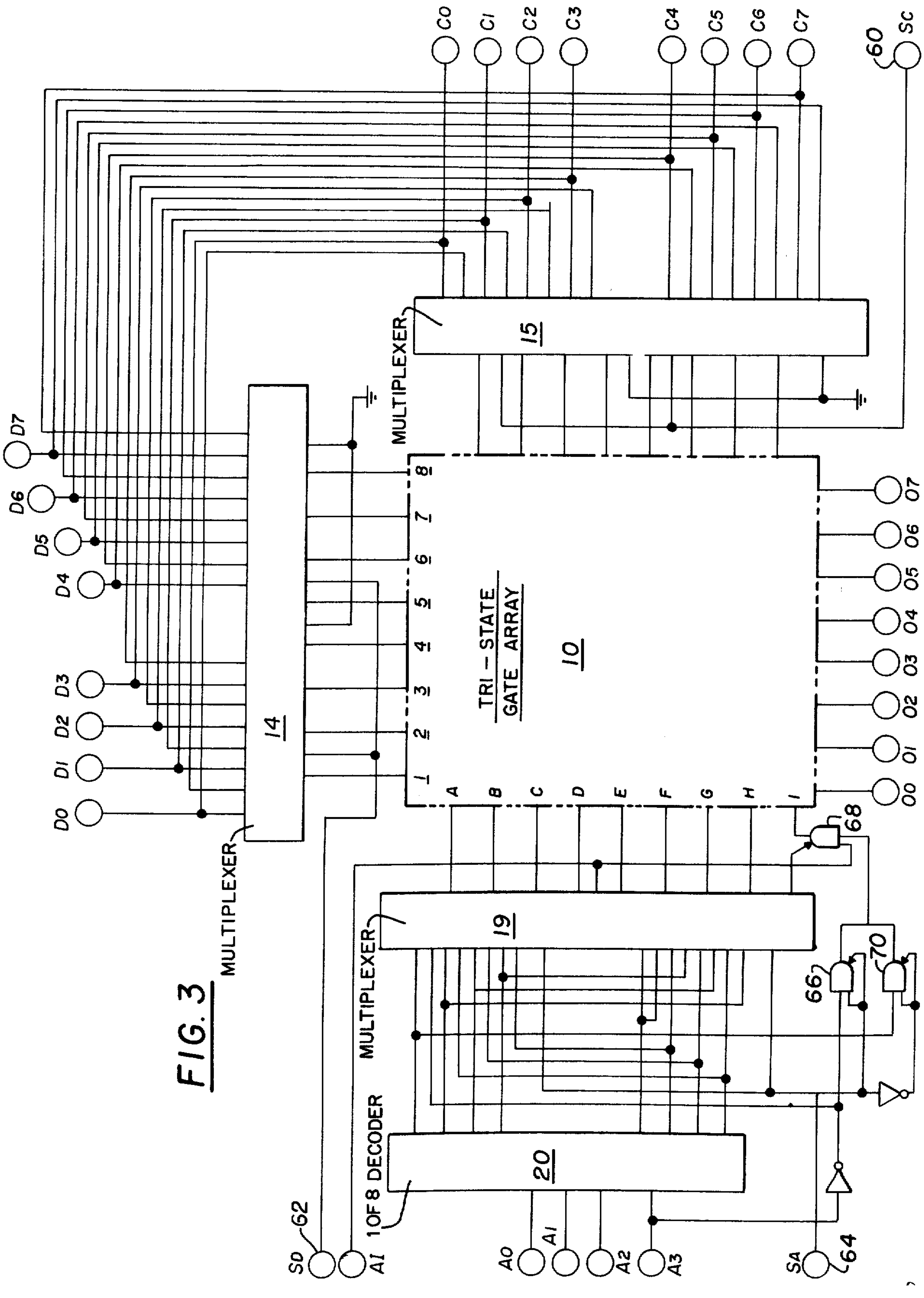
FIG. 3 is a diagram showing the functional interconnections of the components of FIG. 1.

In operation and in the shift left mode of operation, data signals applied to inputs $D_0$ through $D_7$ are allowed to pass through multiplexer 14 and are blocked from entering through multiplexer 15. Conversely, the carrier signal applied to inputs $C_0$ through $C_7$ are allowed to pass through multiplexer 15 and are blocked from entering through multiplexer 14. In the shift right mode of operation, data signals applied to inputs $D_0$ through $_7$ are blocked from entering through multiplexer 14 nd allowed to pass through multiplexer 15. Conversely ie carrier signals applied to inputs $C_0$ through $C_7$ are locked from entering through multiplexer 15 and al- owed to pass through multiplexer 14. The shift right or eft mode is determined by the signal applied to termi- als 60 and 62 and in addition to terminal 64. The mount of shift is determined by the control signal ap- lied to 1 of 8 decoder 20 (which may be an SN 4,138) at terminals $A_0$, $A_1$, $A_2$, and $A_3$. The outputs rom 1 of 8 decoder 20 is fed to multiplexer 19 which iay be two DM 8123 tri-state multiplexers. The partic- lar row enabled signal output from multiplexer 19 is etermined by the value of the shift select word applied o terminals $A_0$ through $A_3$. The table of FIG. 4 illus- rates how each row is enabled by each shift select vord. For example, if all inputs are low (L) in the shift eft mode row A will be enabled corresponding to a ero shift. In another example, if $A_0$ is high (H) and the est are low (L), row B is enabled corresponding to a ne bit shift to the left. As can be seen in FIG. 3, the ata input to column 8 is blocked and allows the input o $C_0$ to appear at the output $O_7$.

Gates 66, 68, and 70 are provided to expand multi- lexer 19 (which can handle an eight bits) to handle ine bits which is required for the number of rows used 1 the gate array 10.

Obviously many modifications and variations of the resent invention are possible in the light of the above eachings. It is therefore to be understood that within he scope of the appended claims the invention may be racticed otherwise than as specifically described.

What is claimed is:

1. An asynchronous data bit shifter for shifting a data vord to the left or right depending on the value of the hift select word said shifter comprising:

a. a first input means for receiving a carry signal input, b. a second input means for receiving a data signal input, c. a third input means for receiving a control signal input, d. a matrix of tri-state gates, one-half of said gates having their inputs connected to said second input means and the other half of said gates having their inputs connected to said first input means, the control elements of said gates being coupled to said third input means so that input data coupled to said first and second input means can be asynchronously shifted right and left in response to a command signal applied to said third input means.

2. The data shifter of claim 1 wherein said matrix consists of columns and rows of tri-state gates, said input means for receiving data signals being connected to one-half of the inputs of said tri-state gates for shifting data signals applied thereto to the left and means for coupling data signals to the said other half of the inputs of said tri-state gates for shifting data to the right.

3. The data shifter of claim 1 wherein in a shift left mode of operation the first input means for receiving carry signals is coupled to the inputs of said gates for one-half of the matrix and the second input means for receiving data signal is coupled to the inputs of said gates for the other half of said matrix and in a shift right mode of operation the carry and data signals coupled to said first and second input means are reversed.

4. The data shifter of claim 1 wherein said matrix comprises rows and columns of tri-state gates, the outputs of all the gates in a column being connected to a common output bus, and the control inputs of all of said gates in a row are connected to a common control input means.

* * * * *